United States Patent
Viswanath et al.

(10) Patent No.: US 11,520,748 B2
(45) Date of Patent: Dec. 6, 2022

(54) APPLYING APPEND-ONLY POLICIES FOR FILES

(71) Applicant: HEWLETT PACKARD ENTERPRISE DEVELOPMENT LP, Houston, TX (US)

(72) Inventors: Logeswari P. Viswanath, Bangalore (IN); Sridhar Bandi, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 662 days.

(21) Appl. No.: 16/206,342

(22) Filed: Nov. 30, 2018

(65) Prior Publication Data
US 2020/0174976 A1  Jun. 4, 2020

(51) Int. Cl.
G06F 16/18 (2019.01)
G06F 16/188 (2019.01)
G06F 21/62 (2013.01)
G06F 21/64 (2013.01)

(52) U.S. Cl.
CPC ........ G06F 16/1805 (2019.01); G06F 16/188 (2019.01); G06F 21/6209 (2013.01); G06F 21/64 (2013.01)

(58) Field of Classification Search
CPC ............... G06F 16/1805; G06F 16/188; G06F 21/6209; G06F 21/64
See application file for complete search history.

(56) References Cited

U.S. PATENT DOCUMENTS

| | | | |
|---|---|---|---|
| 2002/0046275 A1* | 4/2002 | Crosbie | G06F 21/552 709/224 |
| 2013/0139244 A1* | 5/2013 | Blaich | G06F 21/629 726/11 |
| 2014/0195564 A1* | 7/2014 | Talagala | G06F 12/0804 707/802 |
| 2016/0188897 A1 | 6/2016 | Zatko | |
| 2016/0335429 A1* | 11/2016 | Smith | G06F 21/6281 |
| 2017/0364681 A1 | 12/2017 | Roguine | |
| 2018/0062852 A1* | 3/2018 | Schmahmann | G06Q 10/101 |

OTHER PUBLICATIONS

"Prevent Files and Folders from Accidental Deletion or Modification in Linux." Feb. 1, 2017, <https://ostechnix.com/prevent-files-folders-accidental-deletion-modification-linux/>.
Andrew Lockhart, "Protect Your Logs from Tampering," Retrieved from Internet Aug. 8, 2018, <https://www.safaribooksonline.com/library/view/network-security-hacks/0596006438/ch01s06.html >.
(Continued)

*Primary Examiner* — Cheng-Feng Huang
(74) *Attorney, Agent, or Firm* — Mahamedi Paradice LLP (57) ABSTRACT

A computer system associates a given file of a file system with append-only policy that is specified by an owner of given file. The computer system can subsequently intercept file system operations for the file system, including file system operations that specify the given file. The computer system can unconditionally apply the append-only policy to requesting entities, independent of the requesting entities' access level with respect to the file system.

18 Claims, 4 Drawing Sheets

(56) References Cited

OTHER PUBLICATIONS

GitHub—ssbc/secure-scuttlebutt: A database of unforgeable append-only feeds, optimized for efficient replication for peer to peer protocols, Retrieved from Internet Aug. 8, 2018 <https://github.com/ssbc/secure-scuttlebutt>.
Xin Zhao, "Towards Protecting Sensitive Files in a Compromised System," Nov. 21, 2005, <http://web.eecs.umich.edu/~aprakash/papers/svfs-SISW05.pdf>.
HP-UX 11i v3, "HP-UX Whitelisting A.01.03 Administrator Guide", Edition 1, Mar. 2015, 50 pages.
Lantz et al., "Locking Down Log Files: Enhancing Network Security by Protecting Log Files", vol. VII, No. 2, 2006, pp. 43-47.
Ubuntu Manuals, "apparmor.d—syntax of security profiles for AppArmor", available online at <https://web.archive.org/web/20160508051325/http://manpages.ubuntu.com/manpages/trusty/en/man5/apparmor.d.5.html>, May 8, 2016, 13 pages.
Wikipedia, "Chattr", available online at <https://en.wikipedia.org/w/index.php?title=Chattr&oldid=868882433>, Nov. 15, 2018, 7 pages.

* cited by examiner

APPLYING APPEND-ONLY POLICIES FOR FILES

RELATED TECHNOLOGY

Examples pertain to computer systems and methods for applying append-only policies for files.

BACKGROUND

Host computer systems are increasingly required to meet more heightened security requirements, in an effort to minimize the occurrence of hacking and other unauthorized access to files that may contain sensitive information. For example, host computer systems are typically required to maintain log files for various system events and components. Host computer systems can make the log files available for forensic analysis, threat detection and compliance monitoring, in accordance with increasingly heightened industry and governmental regulations.

Typically, security-related event information is the most critical source for forensic analysis and threat detection. This information is usually captured in the log files of a host computer sub-system. For example, the security-related event information can be recorded by audit, system logs ("syslogs"), authentication logs, etc.

BRIEF DESCRIPTION OF THE DRAWINGS

FIG. 4A through FIG. 4D illustrate example methods which can be performed in connection with an append-only policy, as implemented by an example computing system or process.

DETAILED DESCRIPTION

Examples provide for computer systems that apply append-only policies to specified files (e.g., log files), to protect specified files from modifications that may compromise the contents of the respective files. An example computer system can protect specified files from modifications other than those that append to the existing content of the respective files. Additionally, the computer system apply such append-only policies unconditionally, to each user or requesting entity, irrespective of user access levels.

Examples recognize several shortcomings with conventional file system computers, such as those that are implemented on Unix environments, with respect to the manner in which such computer systems protect log files. In particular, examples recognize that conventional file systems are prone to administrative level security breaches and/or inadvertent administrative modifications. Such shortcomings can compromise the integrity of log files, which are often critical to forensic analysis, threat detection and compliance monitoring. For example, if a hacker can access and modify the log files of a computer file system that the hacker has compromised, the hacker can conceal his or her unauthorized activity. Moreover, the forensic analysis and threat detection processes may not be able to detect the activity when the log files of the computer file system are compromised.

Additionally, under conventional approaches, file system computers typically archive log files for compliance monitoring purposes. If archived log files can be tampered with, or even inadvertently modified, the compliance monitoring can result in misrepresentation of events.

In contrast to conventional file systems and file system logging mechanism, examples provide for computer systems (e.g., file system computers) that are configured to protect log files and other sensitive files that are stored with a respective file system. According to examples, the computer system protects sensitive files against modification and/or misuse, from entities (e.g., users, programs, processes) at any level of access to the protected file system of the computer system. Moreover, examples as described enable a file system computer to implement a policy that limits access and modification of log files to append-only access, where the accessed log file can be appended, without enabling or causing modification to existing portions of the log file. According to examples, the policy can also preclude renaming or removal of a log file.

According to examples, a computer system associates a given file of a file system with append-only policy that is specified by an owner of the given file. The computer system can subsequently intercept file system operations for the file system, including file system operations that specify the given file. The computer system can unconditionally apply the append-only policy to requesting entities, independent of the requesting entities' access level with respect to the file system.

Examples described herein provide that methods, techniques, and actions performed by a computing device are performed programmatically, or as a computer-implemented method. Programmatically, as used, means through the use of code or computer-executable instructions. These instructions can be stored in a memory resource of the computing device. A programmatically performed step may or may not be automatic.

Additionally, examples described herein can be implemented using programmatic modules, engines, or components. A programmatic module, engine, or component can include a program, a sub-routine, a portion of a program, or a software component or a hardware component capable of performing stated tasks or functions. As used herein, a module or component can exist on a hardware component independently of other modules or components. Alternatively, a module or component can be a shared element or process of other modules, programs, or machines.

Moreover, examples described herein can utilize specialized computing devices, including processing and memory resources. For example, examples described may be implemented, in whole or in part, on computing devices such as servers, desktop computers, cellular or smartphones, personal digital assistants (e.g., PDAs), laptop computers, printers, digital picture frames, network equipment (e.g., routers), wearable computing devices, and tablet devices. Memory, processing, and network resources may all be used in connection with the establishment, use, or performance of any example described herein (including with the performance of any method or with the implementation of any system). For instance, a computing device coupled to a data storage device storing the computer program and to execute the program corresponds to a special-purpose computing device. Furthermore, any computing systems referred to in the specification may include a single processor or may be architectures employing multiple processor designs for increased computing capability.

Furthermore, examples described herein may be implemented through the use of instructions that are executable by a processor. These instructions may be carried on a computer-readable medium. Machines shown or described with figures below provide examples of processing resources and computer-readable mediums on which instructions for implementing examples described can be carried and/or executed. In particular, the numerous machines shown with examples described include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Figure 1:
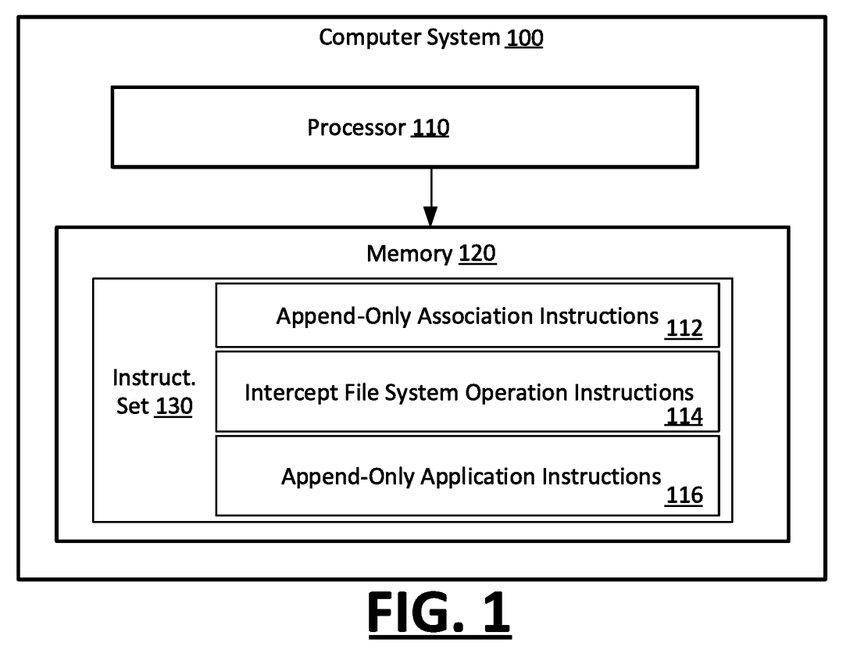
FIG. 1 illustrates an example computer system to implement append-only policies on specified file objects of a protected file system.

FIG. 1 illustrates an example computer system to implement append-only policies on specified file objects of a protected file system. As described by various examples, the computer system can implement append-only policies, which, when implemented by the computer system, preclude any changes to specified files, other than changes which append to the specified files. In examples, the computer system 100 can be implemented as a controller or other component of a network computer system on which a file system is provided for multiple users or programmatic entities.

In examples, the system 100 includes a processor 110 and a memory 120 to store a set of instructions 130. The processor 110 can access the instructions set 130 to apply an append-only policy to select file objects (or "files") of a file system. In examples, the instruction set 130 includes instructions to determine whether individual file objects are associated with an append-only policy ("append-only association instructions 112"), instructions to intercept file system operation that specify file objects which may be associated with an append-only policy ("intercept file system operation instructions 114"), and instructions to unconditionally apply an append-only policy to a specified file object ("append-only application instructions 116").

In examples, the processor 110 executes the append-only association instructions 112 to associate a file of a file system with an append-only policy of a corresponding file system. The association can be specified by, for example, a file owner. The association can be recorded and stored through a policy store that persistently maintains the append-only policy in association with a specified file object, based on selection input and configurations of a file owner. In examples, the file owner can make the association through a cryptographic association, so that subsequent modification or change to application of the append-only policy may only be possible through an entity that possesses a corresponding cryptographic key.

In examples, the processor 110 executes the intercept file system operation instructions 114 to intercept file system operations that are directed to a corresponding file system. The processor 110 can execute the intercept file system operation instructions 114 to intercept and parse individual file system operations from requesting entities, where the requesting entities may correspond to programmatic entities and user entities having different user access levels, including administrative level access. The programmatic entities can include, for example, programmatic processes that generate request operations which specify file objects of a file system that is protected by the computer system 100. The user entities can include users of different user levels who may also access file objects of the protected file system. The respective entities can have different user access levels.

In examples, the processor 110 can execute the append-only application instructions 116 to apply the append-only policy unconditionally, so that the policy is applied to all requesting entities, irrespective of the access level the respective requesting entity has to access files of the protected file systems. Thus, for example, an entity with administrative-level access to files of the file system can be restricted from performing operations that would truncate or modify the file objects. In the context of log files, programmatic entities can access log files of a file system to write new data to record logging events. The computer system 100 can protect such log files from unauthorized access that would cause the contents of the log file to change. Thus, for example, an unauthorized user can be prevented from modifying log files that would otherwise indicate that user's unauthorized activities.

Figure 2:
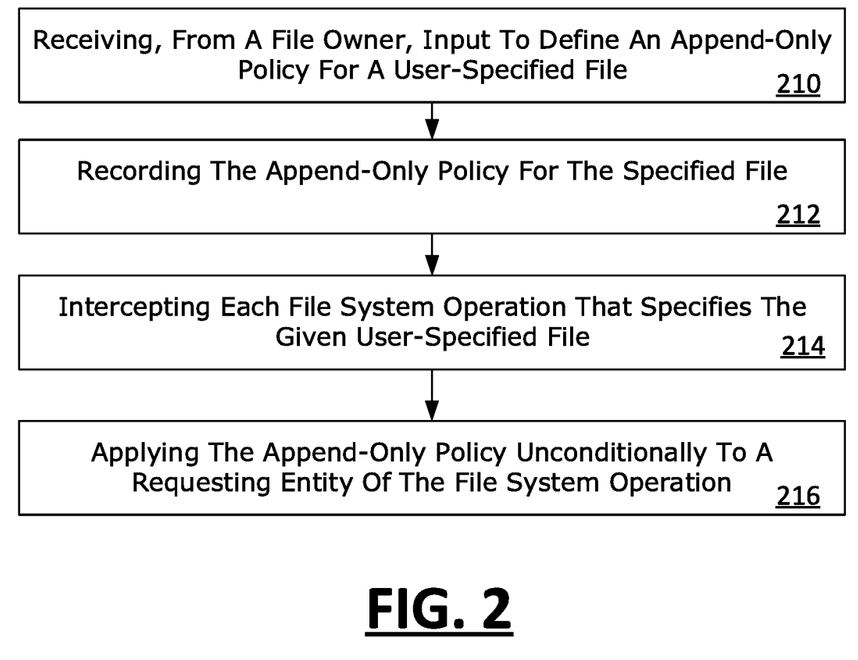
FIG. 2 illustrates an example method to implement append-only policies on specified file objects of a protected file system.

FIG. 2 illustrates an example method to implement append-only policies on specified file objects of a protected file system. An example method such as described with FIG. 2 can be implemented using, for example, a computer system such as described with an example of FIG. 1. Accordingly, reference may be made to elements of FIG. 1 for purpose of illustrating suitable components or steps for performing a step or sub-step being described.

With reference to an example of FIG. 2, the system 100 can receive input from a file owner or other entity that is to control a file object (210). For example, the system 100 can receive input from a file owner that specifies a file object (e.g., log file, or set of log files). The input can specify policy by subject with/or a particular object (e.g., file system object). In this way, the policy can define the operations that can be performed by subjects (e.g., all subjects, including subjects with administrative level access)

In examples, the system 100 records the append-only policy for the specified file (212). For example, the system 100 can maintain a policy store that associates individual policies (e.g., append-only policies) with specific file objects of a protected file system. The policy store can be protected using, for example, cryptographic technology, where specific policies can be accessed for modification by holders of respective cryptographic keys. In examples, a file owner can be provided with a cryptographic key that enables the file owner to control subsequent application of the append-only policy. In this way, the append-only policy can be applied uniformly to entities of all access levels, including entities with administrative access to the protected file system.

The system 100 can further operate to intercept each file system operation that specifies a protected file object (214). In examples, the system 100 intercepts all file system operations from user-entities (e.g., users operating terminals) and programmatic entities (e.g., processes that generate log files), which are targeted for file objects of a protected file system.

In examples, the system 100 unconditionally applies the append-only policy to an associated file object of the protected file system. The system may apply the policy in response to receiving, for example, a file system operation from a requesting entity. As described with other examples, the append-only policy can deny modification to the file object, while allowing, for example, a programmatic entity to write to an end of the file. In this way, the system can protect log files from file system operations that would otherwise modify the contents of the log file (e.g., through truncation, or write-over operations), while permitting normal file system operations that append data to the end of a log file.

Figure 3:
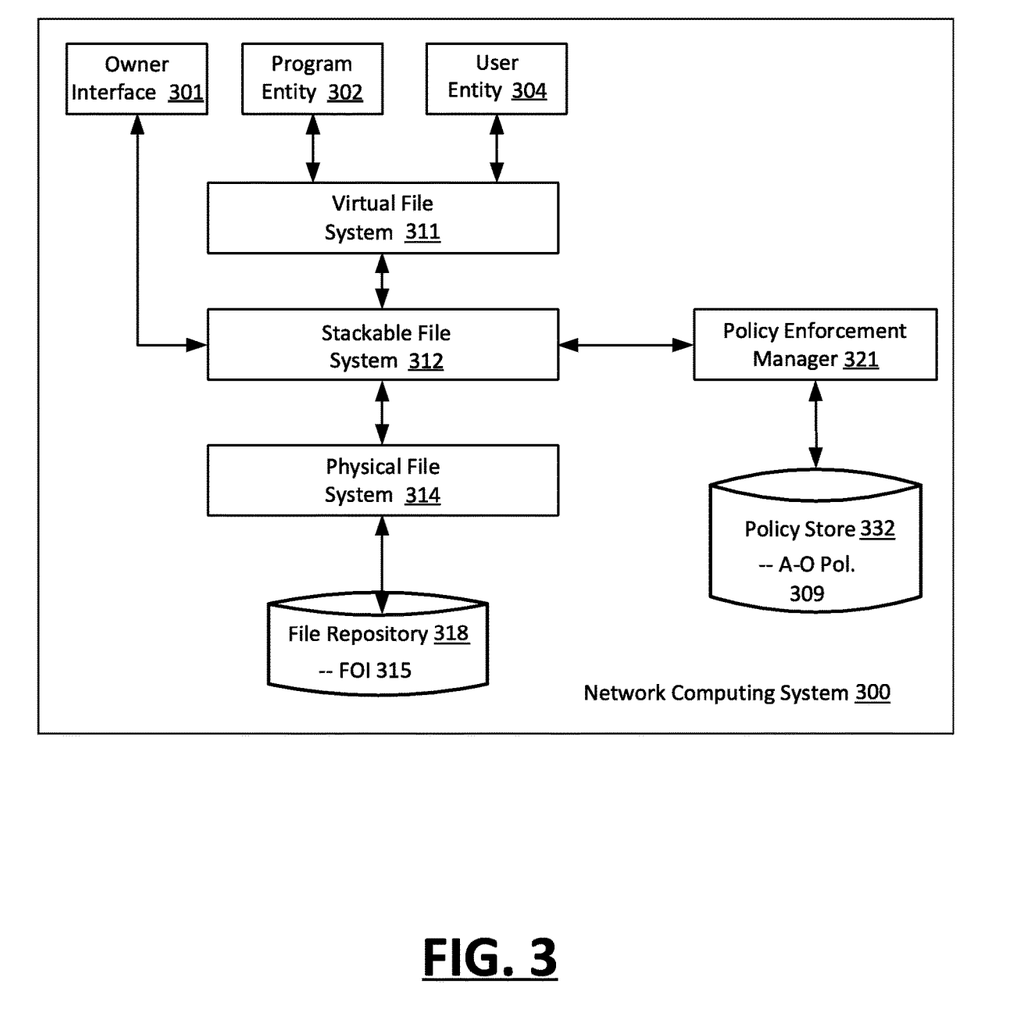
FIG. 3 illustrates another example network computing system to implement append-only restrictions on select files of a protected file system.

FIG. 3 illustrates another example network computing system to implement append-only restrictions on select files of a protected file system. An example system 300 can be implemented using, for example, a computer system such as shown with an example of FIG. 1. Accordingly, the system 300 can be implemented by a computing device (e.g., server) or a combination of computing devices that operate under a common framework. For example, the system 300 can be implemented by a combination of computing devices (e.g., servers) that operate under a Unix framework. Still further, aspects of the system 300 may be virtualized, with logical partitions and resources that collectively form a given computing environment.

In examples, the system 300 can include one or multiple file systems, represented by stackable file system 312 and physical file system 314. The stackable file system 312 may be serviced by a virtual file system 311. The virtual file system 311 can receive and forward file system operations of requesting entities to the next file system stacked below it. Additionally, the virtual file system 311 can receive responses to the requested file system operations from the receiving file system, and send the responses back to the requesting entities 302,303. In examples, the virtual file system 311 can be implemented separate and independent to each of the respective file systems 312, 314.

In examples, stackable file system 312 can be implemented as, for example, a stackable logical component of a kernel or as a mandatory access control (MAC) component of a Unix framework. The stackable file system 312 can be logically and/or physically positioned to intercept file system operations directed by program entities 302 and/or user entities 304. The stackable file system 312 can implement a set of policies that are specific to individual file system objects of a file repository 518 (e.g., file object of interest ("FOI 315")). The policies can include file-specific policies, which can be specified by, for example, a file owner, via an owner interface 301. For example, an owner can specify a policy for a particular file, or collection of files (e.g., files that satisfy a particular criteria, such as being a log file of a particular type, or generated from a particular source). In variations, the file owner can be a programmatic entity that, for example, generates data sets and/or files (e.g., log data, log files). A programmatic or user entity can thus create a file-specific policy for a particular file, or set of files. For example, the owner can generate an append-only policy 309 for the FOI 315, where the FOI 315 corresponds to, for example, a log file.

According to examples, the append-only policy 309 is unconditional, such that the policy is applicable to all user-levels of access. In examples, the append-only policy 309 can be cryptographically protected. For example, the owner can utilize an RSA protocol to cryptographically create and store the append-only policy 309 with a policy store 332.

The virtual file system 311 can intercept file system operations from multiple entities, including the programmatic entities 302 and user entities 304. The stackable file system 312 can determine a file object of each file system operation, and determine whether a policy exists for the file object specified with each file system operation. The stackable file system 312 does this with the help of policy enforcement manager 321, which can determine whether a policy exists for a specified file object, and if a policy exist, then implement the policy.

In examples, the append-only policy 309 can be specified for certain types of files, such as log files. The virtual file system 311 can receive file system operations from, for example, a program entity 302 that specifies the FOI 315. The policy enforcement manager 321 can check the policy store 332 to determine whether there is a policy for the FOI 315. If an append-only policy is specified, for example, the policy enforcement manager 321 can evaluate the respective file system operation to determine whether implementation of the file system operation would violate the policy. If implementation of the file system operation would violate the policy, the stackable file system 312 can deny the file system operation. Otherwise, the stackable file system 312 can service the operation on the respective physical file system.

For sensitive files (e.g., log files), the file-specific policy can be an append-only policy. The stackable file system 312 can intercept the file system operation that specifies a given log file (e.g., FOI 315), identify an append-only policy 309 that is associated with the log file, and then unconditionally apply the append-only policy to the log file. When unconditionally applied, the append-only policy 309 is applied to requesting entities of all access levels, including the administrative access level. Thus, for example, an administrator level user cannot select to make an append-only policy 309 inapplicable to a specified file object. The stackable file system 312 applies the append-only policy to all file system operations that specify the particular file object, irrespective of the access level of the requesting entity, or settings which may be separately applied to the file object by, for example, an administrator level entity.

According to examples, the stackable file system 312 implements an append-only policy 309 that enables event data to be written to a log file, and once written, to remain as part of the log file. Moreover, the append-only policy 309 can preclude implementation of file system operations which can cause the specified file object to be lost, removed or otherwise made not subject to the policy.

FIG. 4A through FIG. 4D illustrate example methods which can be performed in connection with an append-only policy, as implemented by an example computing system or process. Example methods, as described, may be implemented using, for example, a system such as described with an example of FIG. 3. Accordingly, reference may be made to elements of FIG. 3 for purpose of illustrating a suitable component or element for performing a step or sub-step being described.

Figure 4A:
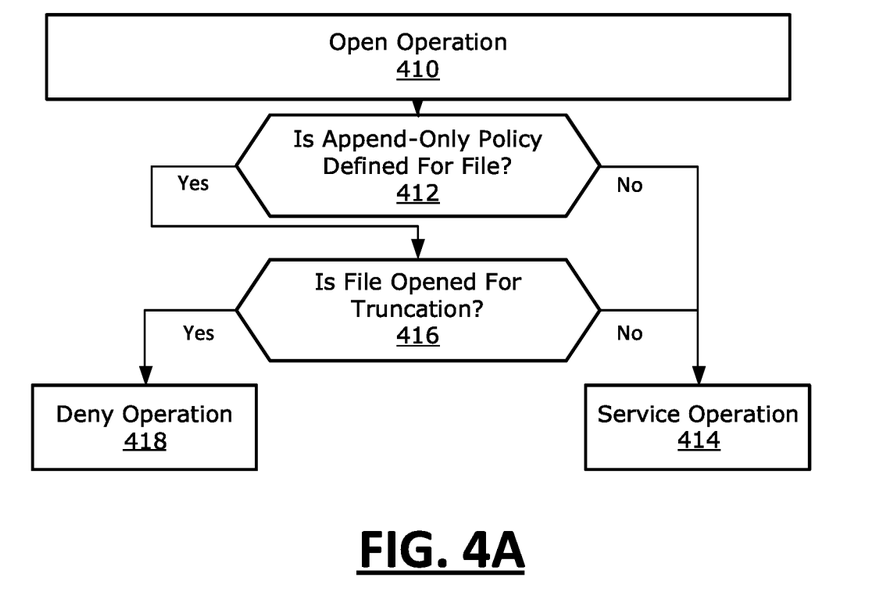

In an example of FIG. 4A, the system 300 can receive a file system operation that specifies an open-truncate type operation (410). In an open-truncate type operation, the specified file object is truncated upon the file object being opened. The system 300 makes an initial determination as to whether the specified file is subject to an append-only policy (412). If the determination is that the specified file is not subject to an append-only policy, then the system 300 can permit the file system operation to be performed (414). Else, the system 300 can make another determination as to whether the specified file object is opened for truncate (e.g., such as flagged with O_TRUNC flag) (416). If the determination is that the specified file object is opened for truncate, then the system 300 can deny the operation (418). The denial of the operation can be performed at the system 300, without forwarding of the operation to the respective file system.

Figure 4B:
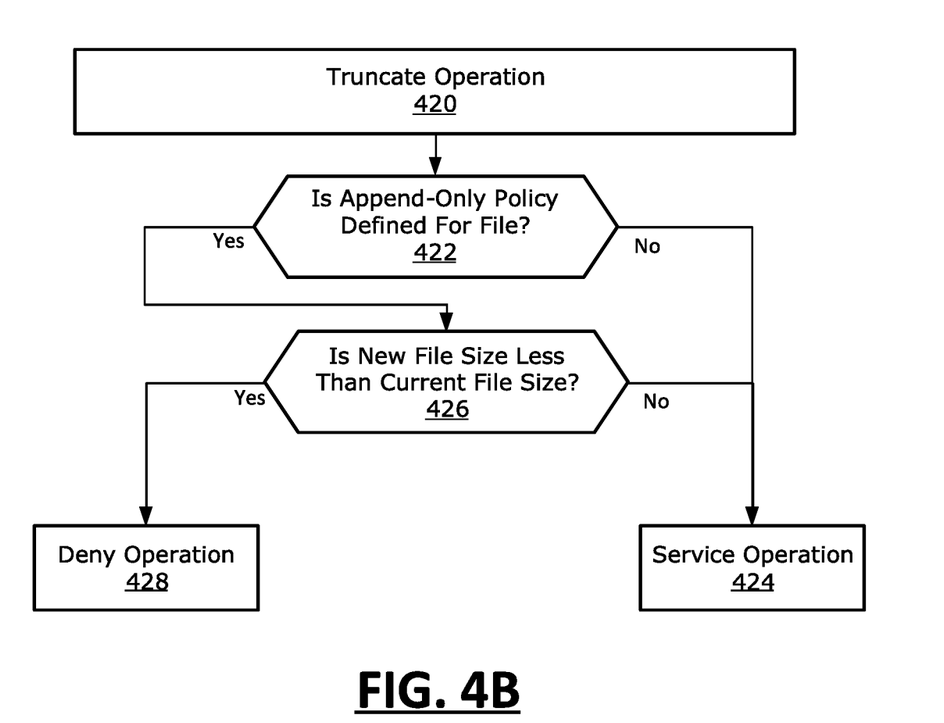

In an example of FIG. 4B, the system 300 can receive a file system operation that specifies a truncate (e.g., ftruncate operation) operation (420). The system 300 makes an initial determination as to whether the specified file is subject to an append-only policy (422). If the determination is that the specified file is not subject to an append-only policy, then the system 300 can permit the file system operation to be performed (424). Else, the system 300 can make another determination as to a condition of performing the truncate operation, specifically to check on a condition of whether performing the truncate operation would cause the specified file to have a lesser size (426). In an example, the controller 420 can check whether the truncate operation of the specified file system operation, if performed, would cause a size of the specified file to become less than the current file size. If the system 300 determines that the condition resulting from performance of the operation is false (e.g., new file size is greater than current file size), then the file system operation is permitted (e.g., forwarded to respective file system for performance), or performed (424). Else, if the system 300 determines the condition to be true (so performance of the file system operation would reduce the size of the specified file), the operation is denied (428). In this way, a requested file system operation to truncate the file is permitted only if the truncate operation does not reduce the file length or size.

Figure 4C:
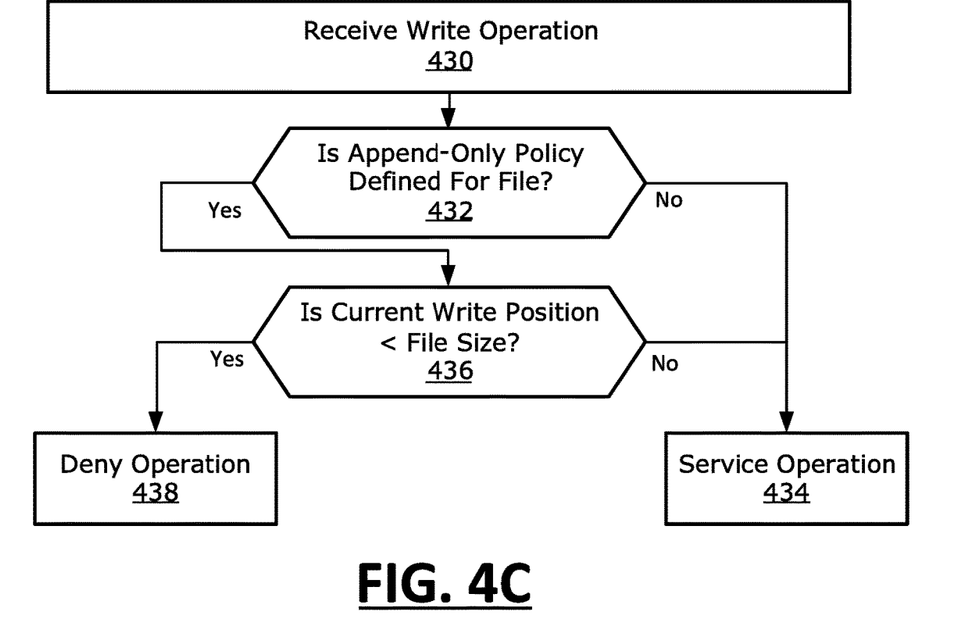

In an example of FIG. 4C, the system 300 can receive a file system operation that specifies a write-type operation (430). The system 300 makes an initial determination as to whether the specified file is subject to an append-only policy (432). If the determination is that the specified file is not subject to an append-only policy, then the system 300 can permit the write-type operation to be performed (434). Else, the system 300 can make another determination as to a condition of performing the write-type operation, specifically to check on a condition of whether performing the write-type operation would over-write the specified file to have a lesser size (436). In an example, the system 300 can check whether the write-type operation of the specified file system operation, if performed, would over-write the specified file. If the system 300 determines that the condition resulting from performance of the write-type operation is false, then the file system operation is permitted (e.g., forwarded to respective file system for performance), or performed (434). Else, if the system 300 determines the condition to be true, the operation is denied (438). In this way, a requested write-type operation is only permitted for a file that is protected by an append-only policy if the write-type operation does not over-write any portion of the specified file.

Figure 4D:
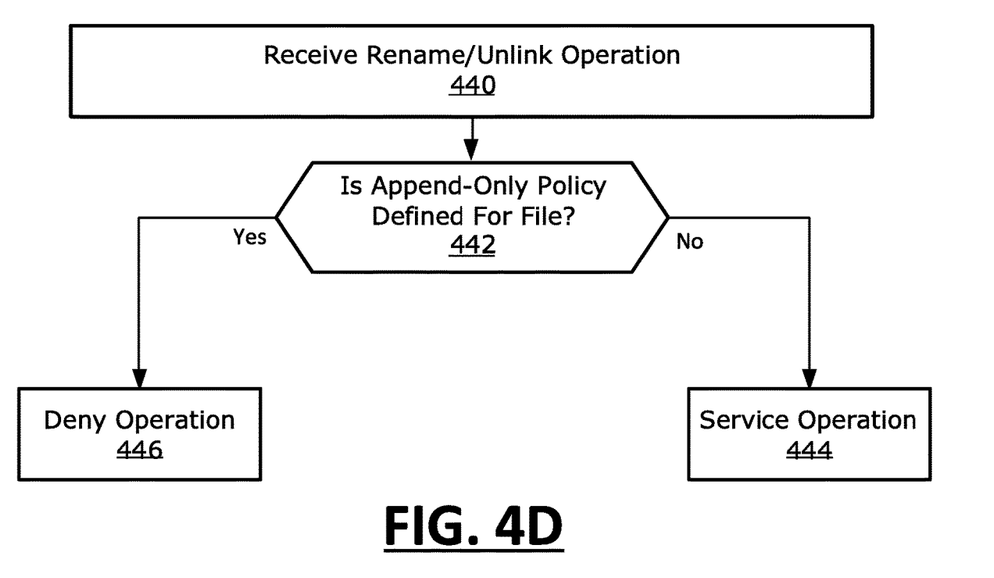

In an example of FIG. 4D, the system 300 can receive a file system operation that specifies a new file name or file link for a specified file (440). The system 300 makes an initial determination as to whether the specified file is subject to an append-only policy (442). If the determination is that the specified file is not subject to an append-only policy, then the system 300 can permit the name/link change operation to be performed (444). Else, the system 300 denies the operation (446).

Although specific examples have been illustrated and described herein, it will be appreciated by those of ordinary skill in the art that a variety of alternate and/or equivalent implementations may be substituted for the specific examples shown and described without departing from the scope of the disclosure. This application is intended to cover any adaptations or variations of the specific examples discussed herein.

What is claimed is:

1. A computer system comprising:
a processor;
a non-transitory storage medium storing instructions executable on the processor to:
associate a given file of a file system with an append-only policy that is specified by an owner of the given file;
intercept file system operations that specify the given file; and
apply the append-only policy unconditionally to a respective requesting entity of each file system operation of the file system operations, independent of an access level of the respective requesting entity, wherein the unconditional application of the append-only policy comprises an application of the append-only policy to a file system operation from a requesting entity that has an administrative access level,
wherein a first file system operation of the file system operations is a truncate operation to truncate the given file, and the instructions are executable on the processor to apply the append-only policy by:
making a determination as to whether a size of the given file would decrease if the truncate operation were applied to truncate the given file, and
denying the truncate operation in response to determining that the size of the given file would decrease if the truncate operation were applied to truncate the given file.

2. The computer system of claim 1, wherein the instructions are executable on the processor to apply the append-only policy by:
making a determination as to whether a given file system operation that specifies the given file violates the append-only policy; and
permitting or denying the given file system operation based on the determination.

3. The computer system of claim 1, wherein a second file system operation of the file system operations is an operation to open for truncation that is to truncate the given file upon the file system opening the given file, and wherein the instructions are executable on the processor to apply the append-only policy by denying the second file system operation before the file system opens the given file for the second file system operation.

4. The computer system of claim 1, wherein the instructions are executable on the processor to:
allow the truncate operation in response to determining that the size of the given file would not decrease if the truncate operation were applied to truncate the given file.

5. The computer system of claim 1, wherein a second file system operation of the file system operations is a write operation to write to the given file, and wherein the instructions are executable on the processor to apply the append-only policy by:
making a determination that a write position of the write operation within the given file is before an end of file position of the given file; and
denying the write operation in response to the determination.

6. The computer system of claim 1, wherein a second file system operation of the file system operations is an operation to rename or unlink the given file, and wherein the instructions are executable on the processor to apply the append-only policy by denying the operation to rename or unlink the given file.

7. The computer system of claim 1, wherein a requesting entity of the first file system operation of the file system operations is a program entity.

8. The computer system of claim 7, wherein the append-only policy is transparent to the program entity when the program entity generates the first file system operation that specifies the given file.

9. The computer system of claim 1, wherein the instructions are executable on the processor to implement mandatory access control for the file system, the mandatory access control comprising intercepting the file system operations and applying the append-only policy unconditionally.

10. The computer system of claim 9, wherein the instructions are executable on the processor to associate the given file of the file system with the append-only policy using a mandatory access control policy that is stored in a data store of the computer system.

11. The computer system of claim 10, wherein the append-only policy is removeable only by the owner.

12. The computer system of claim 11, wherein the instructions are executable on the processor to allow control of the append-only policy by the owner based on an encryption key associated with the owner.

13. The computer system of claim 10, wherein the instructions are executable on the processor to implement the mandatory access control for a virtual file system.

14. A method for restricting access to files, the method performed by one or more hardware processors and comprising:
   receiving, from a file owner, an input to associate an append-only policy with a given file;
   recording the append-only policy for the given file;
   intercepting file system operations that specify the given file; and
   applying the append-only policy unconditionally to a respective requesting entity of each file system operation of the file system operations, independent of an access level of the respective requesting entity, wherein the unconditional application of the append-only policy comprises an application of the append-only policy to a file system operation from a requesting entity that has an administrative access level,
   wherein a first file system operation of the file system operations is a write operation to write to the given file, and wherein the applying of the append-only policy comprises:
      making a determination that a write position of the write operation within the given file is before an end of file position of the given file; and
      denying the write operation in response to the determination.

15. The method of claim 14, further comprising:
   allowing a modification of the append-only policy based on a cryptographic key associated with the file owner.

16. The method of claim 14, wherein the append-only policy is cryptographically protected.

17. A non-transitory storage medium comprising instructions that upon execution on a hardware processor cause a computer system to:
   provide a file system;
   provide a mandatory access control component to implement an append-only policy for a first file of the file system;
   store the append-only policy for the first file;
   intercept a plurality of file system operations that are transmitted from a plurality of entities; and
   for each respective file system operation of the plurality of file system operations that specify the first file, apply the append-only policy unconditionally to a respective entity that transmitted the respective file system operation, independent of an access level of the respective entity, wherein the unconditional application of the append-only policy comprises an application of the append-only policy to a file system operation from an entity that has an administrative access level,
   wherein a first file system operation of the plurality of file system operations is a truncate operation to truncate the first file, and wherein the instructions upon execution cause the computer system to apply the append-only policy by:
      making a determination as to whether a size of the first file would decrease if the truncate operation were applied to truncate the first file, and
      denying the truncate operation in response to determining that the size of the first file would decrease if the truncate operation were applied to truncate the first file.

18. The non-transitory storage medium of claim 17, wherein the instructions upon execution cause the computer system to:
   allow the truncate operation in response to determining that the size of the first file would not decrease if the truncate operation were applied to truncate the first file.

\* \* \* \* \*